March 26, 1957  M. J. HAPPE ET AL  2,786,319
MOUNTING FOR RECIPROCATING CUTTING ASSEMBLY
Filed June 12, 1953  5 Sheets-Sheet 1
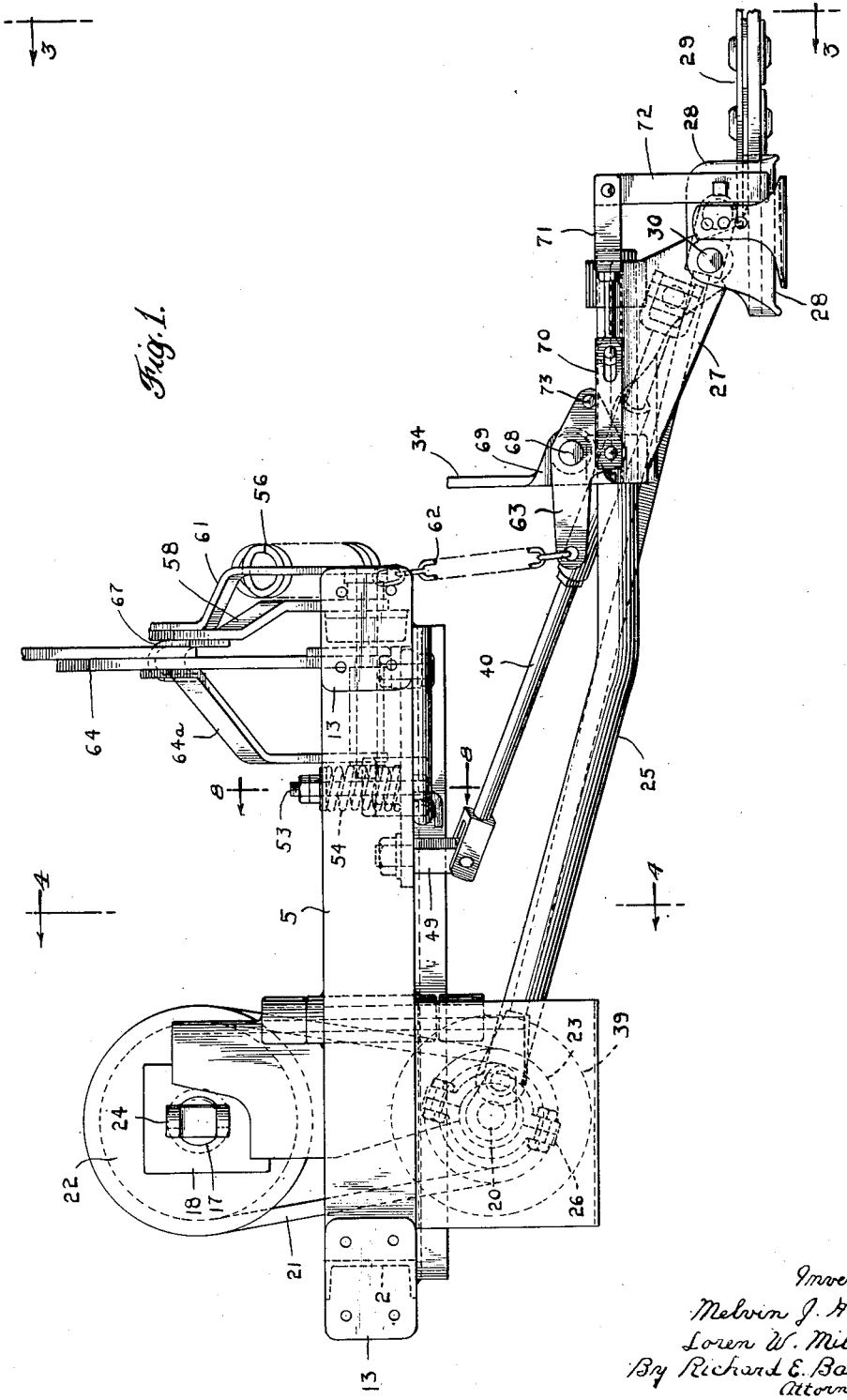
Inventors:
Melvin J. Happe
Loren W. Miller
By Richard E. Babcock Jr.
Attorney

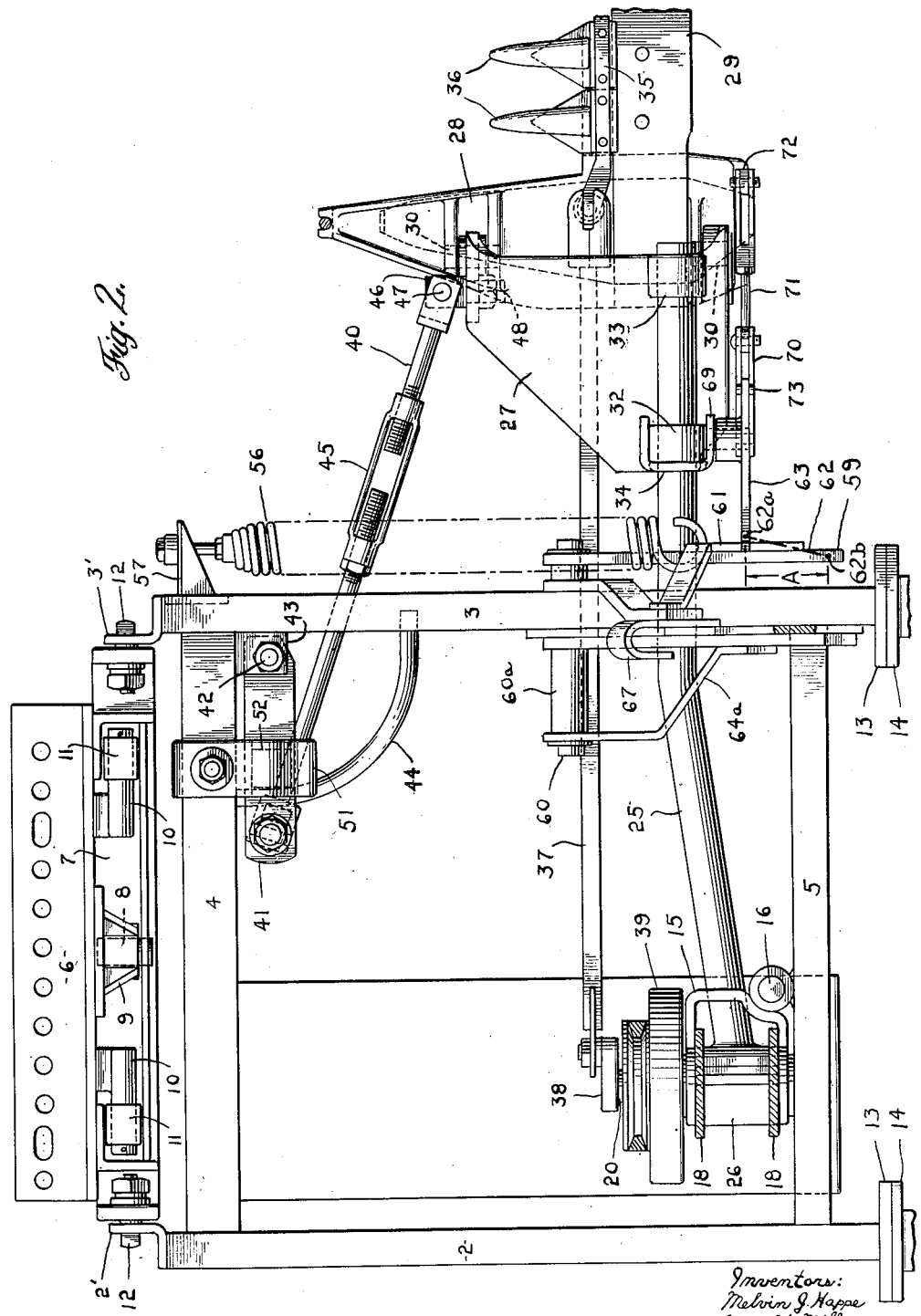

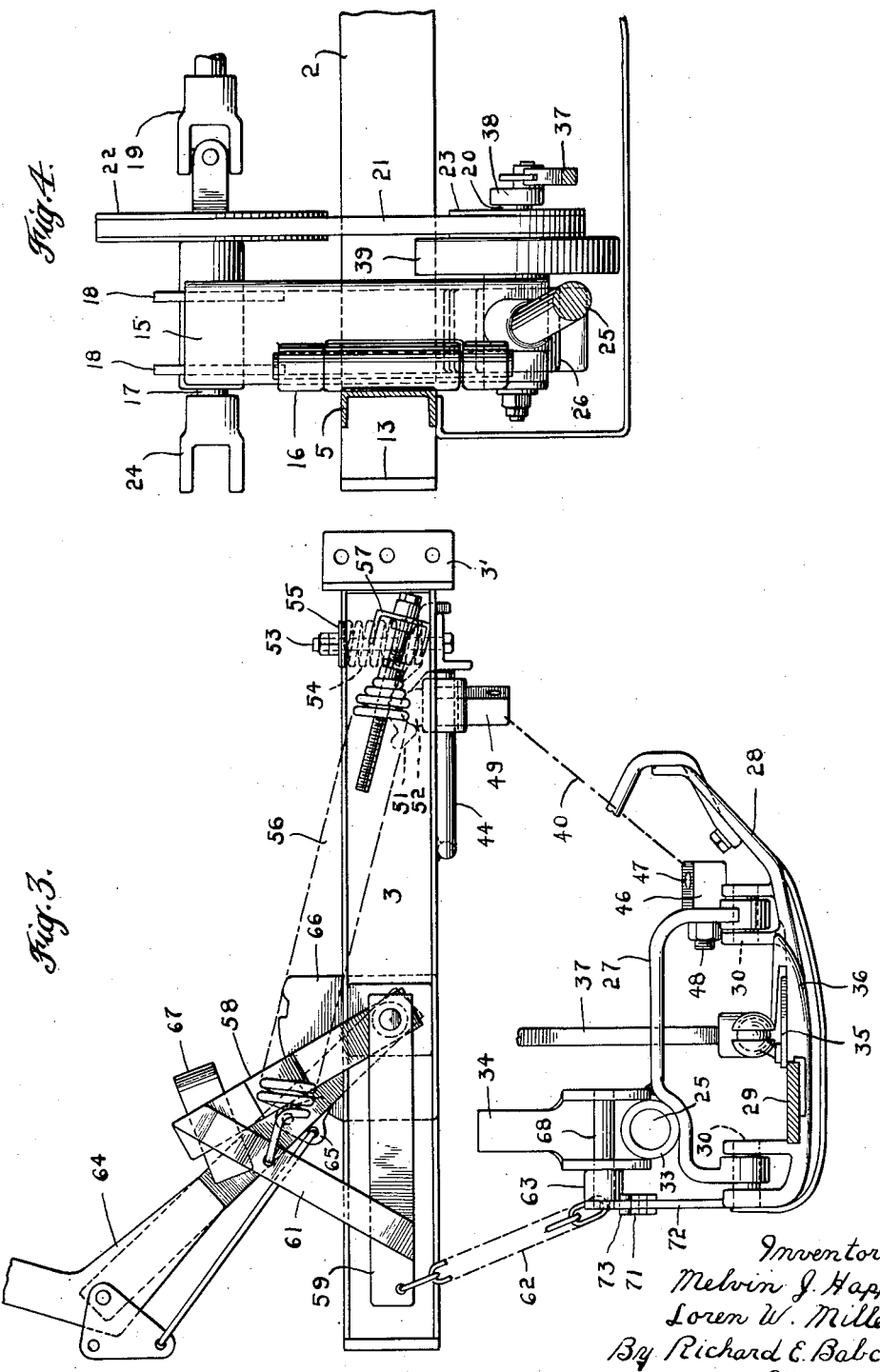

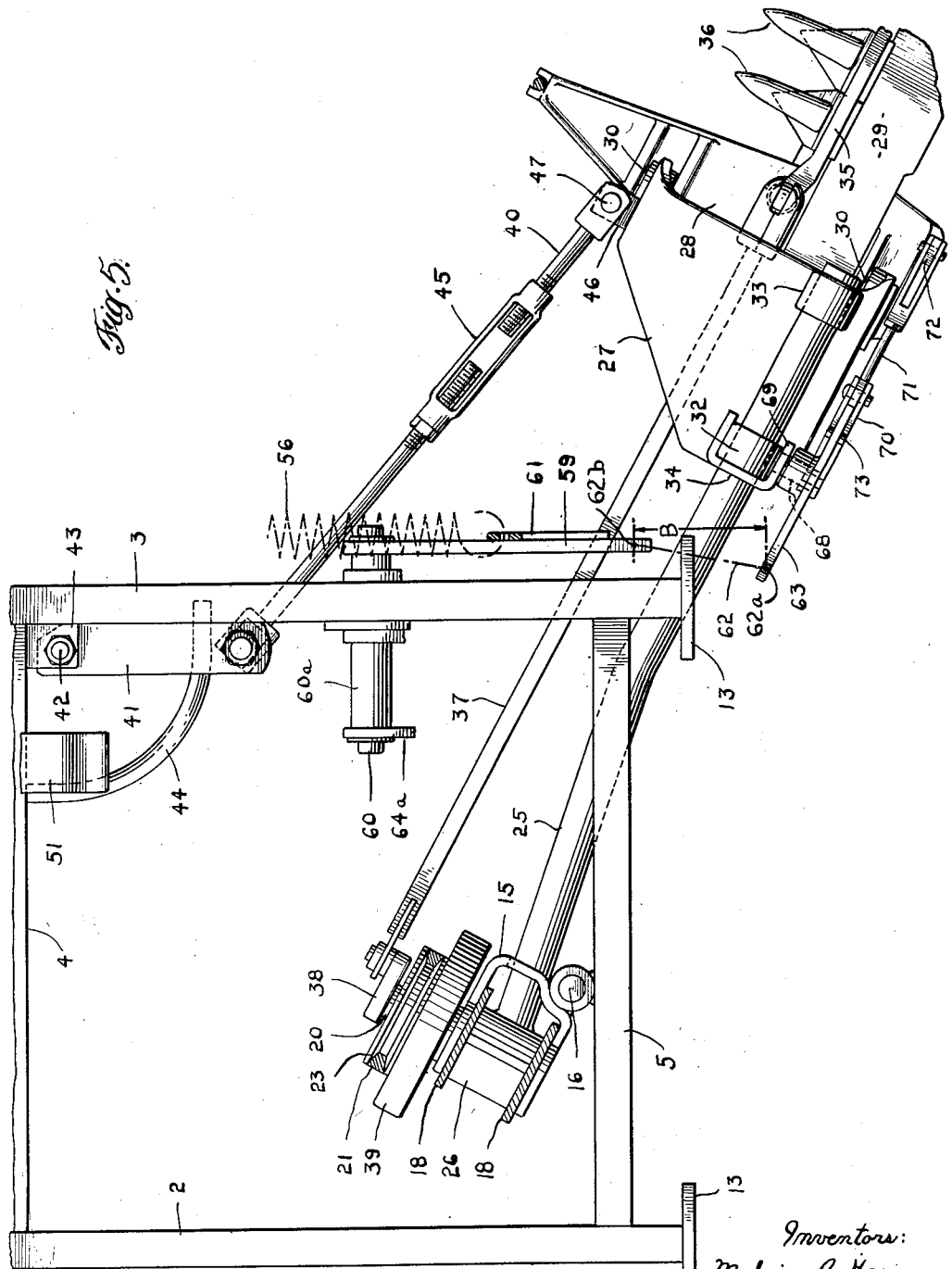

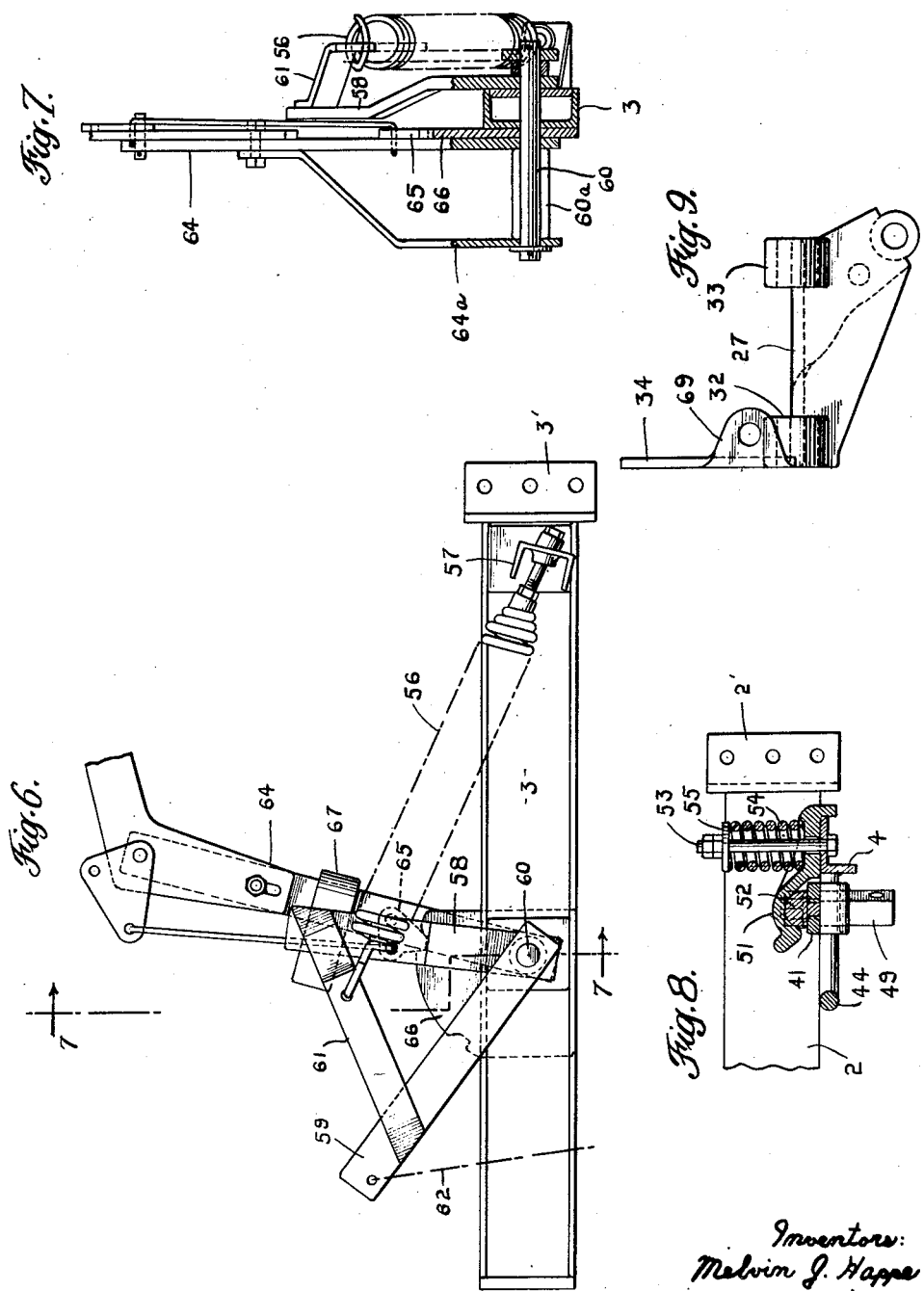

United States Patent Office 2,786,319
Patented Mar. 26, 1957

2,786,319

MOUNTING FOR RECIPROCATING CUTTING ASSEMBLY

Melvin J. Happe, New Holland, and Loren W. Miller, Paradise, Pa., assignors, by mesne assignments, to Sperry Rand Corporation, New Holland, Pa., a corporation of Delaware Application June 12, 1953, Serial No. 361,208

5 Claims. (Cl. 56—25)

This invention relates to a mower of the type generally exemplified in the Raney et al. Patent 2,166,967 in which the cutter bar is carried by a sub-frame which is supported for universal swinging movement on a portable main frame and releasably held against lateral rearward swinging or breakaway movement which may occur when the cutter bar encounters an obstacle.

It is customary in such mowers to limit the rearward swinging movement of the cutter bar within predetermined limits to prevent its impacting against other parts or mechanisms. However in the past the limiting means have been arranged to act abruptly with a resultant jar or impact which may prove damaging to all the mechanisms involved.

With this in mind it is an important object of the invention to provide a floating resilient support for the sub-frame and to so utilize such floating resilient support that it may also function to resiliently snub or cushion the rearward lateral swinging movement of the cutter bar as the latter approaches its positive stop means.

It is also an object to provide a strain releasable automatically resettable breakaway connection for permitting rearward swinging of the cutter bar and for positively limiting such rearward swinging movement.

Moreover it is an object to so arrange the strain release mechanism that same remains operatively associated with the cutter bar at all times and may be automatically reset or reestablished in its latched condition responsive to repositioning of the cutter bar in its operative position.

To this end the strain release mechanism comprises an arm swingable on one of the frame (that is either the main mower frame or the sub-frame which carries the cutter bar) and normally releasably latched in a forwardly swung position. The free end of said arm is connected to the other frame by rigid link means in such manner that an excessive drag on the cutter bar, as when it engages an immovable obstacle, will act through the link to swing the arm and release the latch mechanism, while return of the cutter bar to operative position will act through the link to swing the arm back to its latched position.

Contributory to this, it is a further object to provide stop means for interrupting the rearward swinging movement of the cutter bar before the arm and the link are swung into relatively aligned or dead center positions such as might cause them to function as a toggle to lock the cutter bar against return movement.

It is a still further object to so arrange the parts that once the cutter bar has broken away and swung back it may be automatically reestablished in its operative condition simply by backing of the mower and without manual intervention by the operator. To this end, both the mower drive and the floating support for the cutter bar are of the type which are operative in all of the laterally swung positions of the cutter bar, while the strain releasable mechanism is of the automatically reestablishable type above mentioned.

The foregoing objects and advantages are all attained by the preferred embodiment of the invention illustrated in the accompanying drawings in which:

Figure 1 represents a rear end elevation of a mower incorporating the improved features of the invention, the outer end portions of the cutter bar being broken away;

Figure 2, a plan view of the structure shown in Figure 1 with the upper drive pulley omitted but with its supporting brackets shown in section;

Figure 3, an elevational view looking toward the left in Figure 1, but with the drive housing and its associated mechanism omitted for the sake of clarity;

Figure 4, a fragmentary vertical sectional view taken on the line 4—4 of Figure 1;

Figure 5, a plan view similar to Figure 2 but showing the cutter bar and its supporting sub-frame in the rearwardly swung or broken away position such as these parts will assume when the cutter bar encounters a substantially unyielding object several of the parts being omitted for purposes of clarity;

Figure 6, an elevational view similar to Figure 3 but showing the parts in another position, the cutter bar and various of its associated parts being omitted;

Figure 7, a cross-section on the line 7—7 of Figure 6;

Figure 8, a cross-section on the line 8—8 of Figure 1; and

Figure 9, a detailed view of the yoke which pivotally supports the inboard end of the cutter bar.

The mower shown by way of exemplification in the accompanying drawings comprises a generally rectangular rigid portable main frame which includes the longitudinally disposed side members 2 and 3, respectively connected by the front and rear transverse members 4 and 5. Associated with the front end of this frame is a coupling including the connecting or coupling plate 6 (Figure 2) which is adapted for bolting or otherwise being fixedly connected to the draw bar of a tractor so that the tractor may support the front end of the frame while drawing it along over the ground. The coupling also includes an intermediate cross-member 7 having a pivot 8 rotatable in a bracket 9 on the member 6 to permit transverse rocking of the mower frame. The extent of such transverse rocking is limited by means of laterally projecting studs 10 fixed on the plate or member 6 and having rollers 11 thereon for abutment against the intermediate member 7. Forwardly projecting ears or tabs 2' and 3' respectively on the side frame members 2 and 3 are pivotally connected to the intermediate member 7 as at 12 for relative swinging movement about a horizontal axis transverse to the direction of the movement of the mower. As shown in Figure 3, each of these ears may have a plurality of pivot holes therethrough to receive the pivots 12 and support the front end of the mower frame at any of various heights. Thus it will be seen that by virtue of the pivotal connections 8 and 12 the mower frame is permitted to rock both longitudinally and transversely about its connection to the tractor to thus readily conform to both longitudinal and transverse undulations in the terrain over which the mower travels.

At its rear end the frame is provided with mounting plates 13 which may be rigidly connected to frame members 14 respectively which may represent portions of the rigid frame of a hay pick-up and crushing machine or other crop processing machine which trails behind the mower to pick up and process the mowed hay substantially as shown in the Getz Patents 2,592,269 and 2,592,270.

A drive housing 15 of generally U-shaped cross-section in a horizontal plane is hingedly supported on the rear cross-piece 5 of the mower frame, as at 16 for swinging movement about a vertical axis, as shown in Figures 1 and 4. A driven shaft 17 rotatably supported through brackets 18 in the upper part of the housing 15 is adapted for connection to the power-take-off of a tractor through a usual flexible telescoping type connection 19 which is fragmentarily illustrated in Figure 4 of the drawings. Power is transmitted from this shaft 17 to the mower drive shaft 20 journalled through the lower part of the housing 15 by means of a usual belt drive 21 between pulleys 22 and 23 on the respective shafts. It will be noted that both of the shafts 17 and 20 in the preferred embodiment are disposed parallel to each other in horizontal planes and are swingable with the housing 15 about the hinge connection 16, the telescoping universal driving connection 19 from the tractor power-take-off being operable to transmit driving power to the shaft 17 throughout the range of such swinging movement of the housing 15. It will be noted that the shaft 17 terminates rearwardly in a universal fitting 24 through which power may be transmitted to a pick-up or crusher unit or other crop processing machinery trailing behind the mower.

Supported from the drive housing 15 for swinging movement about a longitudinal axis is a rigid sub-frame or arm 25. In the preferred embodiment the inner end of this arm or sub-frame 25 is swingably disposed through a suitable slot in the drive housing 15 and is journalled by means of a split bearing 26 for concentric movement about the bearing which supports the mower drive shaft 20. Thus since the sub-frame 25 is swingable vertically about the horizontal axis of the lower drive shaft 20 and is swingable laterally about the vertical axis 16 it will be seen that sub-frame 25 is carried by the main frame for universal swinging movement.

Carried at the outer end of the sub-frame or bar 25 is a usual yoke 27 which has a shoe 28 at the inboard end of cutter bar 29 trunnioned or pivoted thereto as at 30 so that the shoe 28 and the cutter bar 29 rigidly connected to the shoe may be swung or adjusted vertically about the axis 30. While the cutter bar 29 may be swung upwardly to an upright inoperative position about the trunnions 30 for transport purposes in accordance with usual practice, it will be understood that it is normally held or supported in substantially horizontal position in conventional manner by means hereinafter described.

Preferably the sub-frame or bar 25 is of round cross-section and the connection between it and the yoke 27 is defined by bearing sleeves 32 and 33 fixed to the yoke 27 and snugly journalled on the bar 25 to define a transverse horizontal pivotal axis around which the yoke 27 together with the shoe 28 and cutter bar 29 may be adjusted or tilted as desired to vary the angle of attack of the cutter bar. Such adjustment may be effected through an adjusting lever 34 fixed on one of the sleeves 32 to be controlled and normally held in fixed position of adjustment in usual manner.

The cutter bar 29 is of usual construction including the usual reciprocating sickle knife 35 and cooperating guard fingers 36. The sickle knife 35 is reciprocated responsive to the rotation of drive shaft 20 by means of a usual pitman 37 connected between the sickle bar 35 and a crank 38 fixed on the drive shaft 20. If desired, a flywheel 39 may be fixed on the shaft 20, in accordance with usual practice.

The sub-frame 25 and cutter bar 29 are normally maintained in a forwardly swung operative position as shown in full lines in the plan view of Figure 2, to project transversely to the path of travel of the mower frame, but are permitted to yield and swing rearwardly about the axis of the pivots 16 to the position shown in Figure 5, when the cutter bar in its operation runs against substantially unyielding objects. Accordingly, the yoke 27 at the free end of sub-frame 25 is connected by a rigid link 40 with an arm 41 which is pivotally connected at 42 to a bracket 43 fixed on the mower frame for horizontal swinging movement. The outer end of the arm 41 is preferably supported on a quadrant member 44 carried by the mower frame for horizontal movement between its forwardly swung position at right angles to the path of travel of the frame and its rearwardly swung position substantially parallel with the path of travel, the latter position being illustrated in Figure 5. When the arm 41 is in its forwardly swung transverse position it will normally act through the link 40 to maintain the cutter bar 29 in transversely projecting operative position. Preferably as shown in Figure 2, the rigid link 40 comprises two threaded sections connected by a turn buckle 45 as in Figure 2 whereby the length of the link 40 may be adjusted as desired to effect the proper operative positions for the cutter bar 29.

In view of the universal swinging movement of the sub-frame 25 and the yoke 27, it is necessary that the link 40 be connected universally both to the yoke 27 and to the arm 41. In order to provide such a connection between the yoke 27 and link 40, the link is pivoted to a stud 46 for movement about a vertical axis 47 and the stud 46 is in turn is pivoted to the yoke 27 for movement about a horizontal axis 48. The opposite end of the link 40 is similarly connected for vertical movement to a stud 49 (Figure 1) rotatable about a vertical axis in the free end of arm 41.

A strain releasable spring catch 51 on the forward cross member 4 of the mower frame is normally in operative engagement with a boss 52 on the arm 41 and thus serves to maintain the arm 41 in its forwardly swung position under normal operating conditions of the mower, but is adapted to yield and release the arm 41 to thus permit rearward swinging or breaking away of the cutter bar 29 when the latter strikes relatively unyielding objects. When this occurs, the arm 41 swings rearwardly until it abuts against the adjacent side member 3 of the mower frame as in Figure 5, thereby permitting rearward swinging of the sub-frame 25 and cutter bar 29 about the axis of the pivot 16 to the positions indicated in the plan view of Figure 5. Thus the adjacent side member 3 of the mower frame acts as a stop to limit the rearward swinging movement of the cutter bar 29 and its supporting sub-frame 25. The arrangement is such that the rearward swinging movement is interrupted before the arm 41 and link 40 assume positions of relative alignment or near relative alignment, whereby they might function as a toggle linkage to lock the cutter bar 29 and sub-frame 25 in their rearwardly swung positions and to resist their return to operative position. By reference to Figure 8 of the drawings it will be seen that the latch 52 is vertically slidable on a pin 53 and is resiliently urged downwardly into operative engagement with its cooperating boss 52 on the arm 41 by means of a coil spring 54 disposed about the pin 53 under compression between the latch member 51 and a washer 55 fixed against axial displacement on the upper end of the pin 53.

Thus it will be apparent that the spring catch 51 and boss 52 comprise a strain releasable latch means normally maintaining the arm 41 and sub-frame 25 in forwardly swung operative positions as shown in Figure 2. Similarly it will be apparent that the link 40, arm 41, and latch means 51, 52 jointly constitute a strain releasable means interconnecting the main frame and sub-frame and normally retaining the sub-frame 25 in its transversely disposed operative position.

There also is provided manually operable means for swinging the sub-frame 25 and cutter bar 29 vertically about the axis of bearing 26 so that the cutter bar may be raised to pass over obstacles or to pass above the crop material when turning corners and the like. In the present construction such a raising or adjusting mechanism is associated with means for floatingly supporting the sub-frame 25 and cutter bar whereby the latter may easily ride over irregularities in the surface of the ground.

The floating support is provided by spring 56 connected under tension between a bracket 57 on the mower frame and a bell crank lever consisting of the arms 58 and 59 pivoted to the side member 3 of the frame as at 60, all as is best shown in Figure 6. These arms are preferably connected and braced by diagonal member 61 to which it has been found convenient to attach the spring 56 as shown. The outer or rearmost end of the arm 59 is connected by a link or flexible tension element in the form of a chain 62 to an element 63 on the yoke 27 so that the spring 56 may thus serve to floatingly support the sub-frame or support 25. An adjusting lever 64 swingable about the pivot 60 carries a usual detent 65 adapted for cooperation with the notched edge of a quadrant plate 66 on the frame member 3 in conventional manner. As shown in Figure 7, lever 64 is laterally braced by a strut 64a also mounted on pivot 60 for swinging movement with lever 64. A spacer 60a on the pivot serves to laterally separate the bases of the two members 64 and 64a. The lever arm 58 carries a U-shaped bracket 67 opening toward the lever 64 with its legs normally depending on opposite sides of the lever 64 to permit a certain amount of lost motion between said lever 64 and the lever arm 58 so that when the control lever 64 is swung downwardly as in Figure 3, this permits lowering of the cutter bar 29 to operative position and yet permits it to be floatingly supported by the spring 56, the closed end of the yoke 67 at this time serving only to limit the downward extent of movement of the sub-frame 25. However, when the control lever 64 is swung upwardly to substantially vertical position as in Figure 6, it abuts against the closed end of the yoke 67 and thus swings the sub-frame 25 and the cutter bar upwardly so that the latter may readily clear obstacles.

As is above noted, the flexible tension element or chain 62 is connected to the sub-frame 25 through an element 63 carried by the yoke 27 on said sub-frame 25. Considering the present invention from its broader aspects, this element 63 may constitute merely any fixed portion of the sub-frame 25 or the several parts carried thereby. However, in the preferred embodiment of the invention the element 63 is in the form of a bell-crank lever pivoted at 68 for vertical swinging movement on a tab 69 fixed on the yoke 27. The chain 62 is connected to the free end of this bell crank lever whereby the spring 56 will normally function through the bell crank lever 58—59 and said chain 62 to exert a resilient upward pull at its point of attachment 62a to the lever 63. Bell crank lever 63 has a lost motion linkage 70—71 to an upstanding arm 72 fixed on the shoe 28 at the inner end of the cutter bar 29 whereby the resilient pull of the chain 62 on the lever 63 may function through the links 70—71 to provide a resilient floating support for the cutter bar 29 about the pivotal connection 30 between its shoe 28 and the yoke 27. The upward movement of the cutter bar 29 under the influence of this floating support is limited by means of a stop 73 on the lever 63 disposed to abut against the link 70 as in Figure 1. The lost motion connection between the links 70 and 71 permits a limited amount of upward swinging of the outer end of the cutter bar independently of the lever 63 as may occur incident to its riding over irregularities of the ground surface.

In the operation of the invention the parts are normally in the position shown in Figure 2, it being noted that the cutter bar is held in its normal operative position wherein it projects transversely to the line of movement of the main mower frame, the arm 41 being latched forwardly as shown to retain the cutter bar in such position. With the control lever 64 positioned as in Figure 3 the sub-frame 25 and cutter bar 29 will be floatingly supported by the action of the spring 56, levers 58 and 59 and the chain 62, so that it may easily rise and fall as required in order that it may ride over irregularities in the contour of the ground. It will be understood that as the main frame of the mower is drawn forwardly by a tractor, the mower drive mechanism is actuated from the power-take-off through the transmission means 19 shown in Figure 4, whereby the sickle knife of the cutter bar is reciprocated to cause operation of the cutter bar in conventional manner.

In the event it is desired to raise the cutter bar 29 either to clear obstacles or to permit unobstructed turning movement of the tractor and mower, this may be done by manually positioning the control lever 64 as shown in Figure 6, thus acting through the lever arm 59 and chain 62 to raise the outer end of the sub-frame 25 and the cutter bar 29.

In the event the cutter bar 29 hits an obstruction of some sort the resultant drag transmitted through the link 40 will jerk the arm 41 free of its cooperating latch 51 and the ensuing rearward swinging of the arm 41 will permit rearward swinging of the sub-frame 25 and cutter bar 29 from the operative position of Figure 2 to the inoperative or broken away position of Figure 5. It will be noted that the rearward swinging movement of the arm 41 is limited by its abutment with the adjoining side member 3 of the main mower frame and that this side member accordingly constitutes a stop means which positively limits the rearward swinging movement of the cutter bar, all as shown in Figure 5. The extreme limit of such rearward swinging movement of the cutter bar 29 may be adjusted within relatively fine limits by suitable actuation of the turn buckle connection 45 of the link 40. During such rearward swinging movement, of the cutter bar and its supporting sub-frame 25, it will be seen that the mower drive mechanism will swing with said sub-frame and will remain operative to drive the mower due to the extensible universal connection 19 between the drive mechanism and the tractor power-take-off.

Also it will be observed that in the rearwardly swung position of the cutter bar as in Figure 5, the lower end or point of connection 62a of the chain or flexible connection 62 to the sub-frame through lever 63 will be displaced laterally rearwardly from its upper end or point of connection 62b to lever 59 a distance B (Figure 5) which is appreciably greater than the distance A of its forward displacement from connection 62b of its upper end when in its operative position as indicated in Figure 2. Thus during the last portion of the rearward swinging movement of the cutter bar, the cutter bar will normally be maintained at a constant horizontal level due to its engagement with the obstacle or obstruction which is responsible for its rearward swinging movement, and the chain 62 will thereby be caused to exert an increased downward pull on the end of the lever arm 59, thereby increasing the tension on the spring 56 and causing the spring 56 thus to cushion the later part of this rearward swinging movement. This will minimize the shock of the engagement of the arm 41 against the adjoining frame member 3 which functions as its cooperating stop and thus will avoid the possibility of damage to the parts such as might obviously occur due to abrupt stoppage.

In the rearwardly swung or broken away position of the sub-frame 25 and cutter bar 29, as shown in Figure 5, the arm 41 abuts against its adjoining frame member 3, which interrupts its rearward swinging movement at a point where the arm 41 is still well out of relative alignment with the link 40. This is of importance since should these parts be permitted to swing into alignment they could function as a toggle linkage and resist return movement of the sub-frame 25 and the cutter bar carried thereby. In any event these parts, that is the link 40 and the arm 41, are operative at all times to maintain a connection between the main frame and the sub-frame 25 of the mower structure, so that in order to return the cutter bar 29 to its normal operative position as in Figure 2, it is necessary only to back the mower a slight distance away from the obstacle, whereupon the drag of the ground and the mowed material upon the cutter bar will swing same back toward operative position. Such return movement of the cutter bar will function through the rigid link 40 to swing the arm 41 back to its transverse position as in Figure 2 causing the latch element 51 to resiliently snap over and reengage the locking stud or boss 52 on the arm 41 and thereby releasably lock the arm 41 in its forward operative position to position the cutter bar for further operation. Since the drive to the cutter bar will never have been interrupted and the floating support for the cutter bar will also have been operative all the time without having been disconnected, it will be seen thus that such return movement of the cutter bar is all that is necessary in order to place it in readiness for continued operation. This may be accomplished simply by backing the tractor and without necessitating that the operator dismount from the tractor or manually reengage or reset any of the mower parts.

In this application, we have shown and described only the preferred embodiment of our invention simply by way of setting forth the best mode contemplated by us of carrying out our invention. However, we recognize that our invention is capable of other and different embodiments and that its several details may be modified in various ways all without departing from the invention. Accordingly, the foregoing description and accompanying drawings are to be considered merely as illustrative in nature and not as exclusive.

Having thus described our invention, we claim:

1. A mower comprising a portable main frame adapted for longitudinal ground traversing movement, a sub-frame mounted on said main frame for universal swinging movement, reciprocating cutting means carried on said sub-frame, a rigid lever pivoted on the main frame for swinging movement in a vertical plane, said lever having a free end disposed above said sub-frame, spring means connecting the lever and the main frame and resiliently biasing said free end upwardly, and a link of fixed length permanently connecting said sub-frame and said free end of the lever, said lever and spring floatingly supporting said sub-frame and said reciprocating cutting means in operative position and resiliently cushioning rearward horizontal swinging of the sub-frame and the reciprocating cutting means.

2. A mower as claimed in claim 1 wherein strain releasable means is provided between said main frame and said sub-frame for normally maintaining the sub-frame and the reciprocating cutting means carried thereon in operative position, said strain releasable means including a member engageable with said main frame to act as a stop for limiting said rearward horizontal swinging of the sub-frame and the reciprocating cutting means.

3. A mower as claimed in claim 1 wherein said lever is in the form of a bell crank having one arm pivotally connected to said main frame and its other arm connected to said spring means, and said link being connected to the bell crank at a point adjacent the juncture of the arms of the bell crank.

4. A mower as claimed in claim 1 wherein said main frame includes a longitudinal member, a generally horizontally projecting arm normally extending substantially perpendicular to said longitudinal member and having one end pivotally connected thereto, strain releasable latch means normally holding said arm in said perpendicular position, a rigid member connecting the end of said arm opposite said one end to said sub-frame and said reciprocating cutting means, said strain releasable latch means being adapted to free said arm for swinging movement about said pivotal connection when there is an excessive drag against said sub-frame and reciprocating cutting means, said arm being engageable with said longitudinal member to limit the pivoting of the arm and the rearward horizontal swinging of the sub-frame and reciprocating cutting means.

5. A mower comprising a portable main frame adapted for longitudinal ground traversing movement, a sub-frame mounted on said main frame for swinging movement about a vertical axis, reciprocating cutting means carried on said sub-frame, strain releasable means interconnecting the main frame and sub-frame and normally maintaining the reciprocating cutting means in an operative position wherein it projects transversely to the direction of movement of the main frame, a bell crank having one arm pivoted on said main frame for movement in a vertical plane, said one arm extending generally parallel to said direction of movement and normally assuming a substantially horizontal position when said sub-frame is in operative position, spring means connecting the other arm of said bell crank to the main frame and resiliently biasing said bell crank upwardly, a link of fixed length permanently connecting said sub-frame and said bell crank, said reciprocating cutting means and sub-frame being adapted to swing rearwardly when an obstacle is encountered by the cutting means, and stop means for limiting said swinging movement, said bell crank and spring means floatingly supporting said sub-frame and said reciprocating cutting means in operative position and resiliently cushioning rearward horizontal swinging of the sub-frame and the reciprocating cutting means.

References Cited in the file of this patent

UNITED STATES PATENTS

| | | |
|---|---|---|
| 1,887,352 | Huddle | Nov. 8, 1932 |
| 1,946,541 | Coultas et al. | Feb. 13, 1934 |
| 2,000,363 | Thoen | May 7, 1935 |
| 2,155,716 | Korsmo et al. | Apr. 25, 1939 |
| 2,166,967 | Raney et al. | July 25, 1939 |
| 2,314,216 | Hilblom | Mar. 16, 1943 |
| 2,318,274 | Westerlund | May 4, 1943 |
| 2,502,805 | Spurlin | Apr. 4, 1950 |
| 2,520,743 | Tanke | Aug. 29, 1950 |
| 2,520,744 | Charley | Aug. 29, 1950 |
| 2,550,412 | Girardi | Apr. 24, 1951 |